Figure 1:
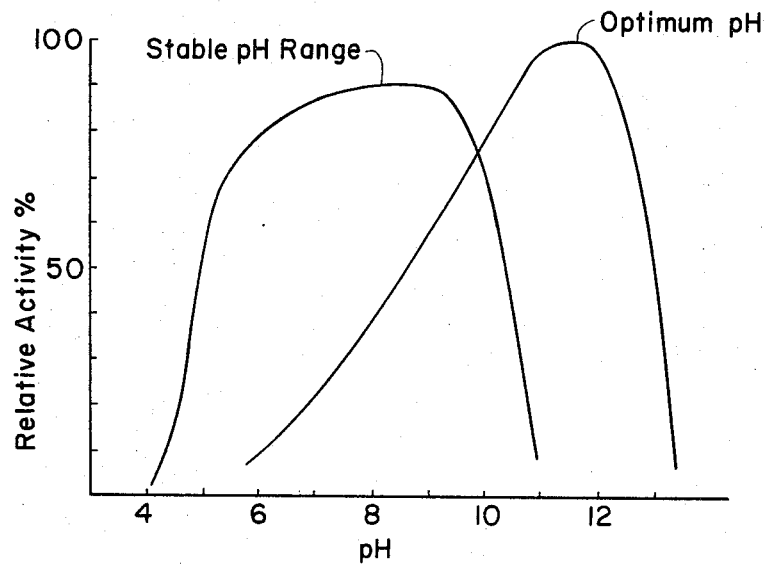

United States Patent [19]
Tobe et al.

[11] 3,871,963
[45] Mar. 18, 1975

[54] MICROBIAL PROTEASE AND PREPARATION THEREOF

[75] Inventors: Sadanobu Tobe, Tokyo; Yoshiteru Hirose, Yokohama; Yoshihiro Nakamura, Tokyo; Koji Mitsugi, Yokohama, all of Japan

[73] Assignee: Ajinomoto Co., Inc., Tokyo, Japan

[22] Filed: Mar. 13, 1973

[21] Appl. No.: 340,841

[30] Foreign Application Priority Data
Mar. 18, 1972 Japan.............................. 47-27973

[52] U.S. Cl................................. 195/62, 195/66 R
[51] Int. Cl........................................... C12d 13/10
[58] Field of Search...................... 195/62, 65, 66 R

[56] References Cited
UNITED STATES PATENTS

| | | | |
|---|---|---|---|
| 3,622,458 | 11/1971 | Murao et al. | 195/32 |
| 3,723,250 | 3/1973 | Aunstrup et al. | 195/62 |
| 3,748,233 | 7/1973 | Viccaro | 195/66 R |

OTHER PUBLICATIONS
Horikoshi, Agr. Biol. Chem., 35 (9), 1407–1414 (1971).

*Primary Examiner*—Lionel M. Shapiro
*Attorney, Agent, or Firm*—Hans Berman; Kurt Kelman

[57] ABSTRACT

A strain of Bacillus produces a new alkaline protease. The protease is superior to known alkaline proteases in thermostability and resistance to chelating agents, and works at higher pH.

2 Claims, 3 Drawing Figures

MICROBIAL PROTEASE AND PREPARATION THEREOF

The present invention relates to a new type of alkaline protease and the preparation thereof.

Various alkaline proteases have been reported to be useful in detergents. The known proteases have molecular weights of 23,000 to 32,000, have optimum pH between 9 and 13, and are inactivated at pH above 12, or by heating at 50°C in a solution containing 1 percent or more of sodium carbonate.

It has now been found that a certain strain belonging to genus Bacillus produces a large amount of a new alkaline protease in the culture broth. The new enzyme is characterized by its high working pH range, thermostability, substrate specificity, molecular weight of 15,000 to 20,000 isoelectric point, and amino acid composition.

The bacterium which produces the protease is Bacillus sp. (FERM P-1396). Microorganisms identified by FERM P-numbers are available to the public from the Fermentation Research Institute, Agency of Industrial Science and Technology, of the Ministry for Industrial Trade and Industry, Japan. The bacterium was isolated from river water.

Microbial properties of the Bacillus sp. FERM P-1396 are as follows.

1. Morphological properties

Cells: Rods, $0.6 - 0.8 \times 1.8 - 3.6$ microns, occurring singly and occasionally in chains.
Mobility: Motile by means of peritrichous flagella.
Gram stain: Positive
Spore: Not produced on ordinary nutrient agar (made by Difco Co.) at 34°C for 2 days. Not produced on various agar slants nor on the following media at 34°C for 7 days.

| Medium (A): | Glucose | 5 grams |
| --- | --- | --- |
| | Glutamic acid | 10 |
| | Glycine | 0.1 |
| | $KH_2PO_4$ and $K_2HPO_4$ each | 0.5 |
| | $MgSO_4 \cdot 7H_2O$ | 0.2 |
| | $FeSO_4 \cdot 7H_2O$. | |
| | $MnSO_4 \cdot 4H_2O$ | |
| | and $ZnSO_4 \cdot 7H_2O$ each | 0.01 |
| | $CaCl_2$ | 0.01 | dissolved in one liter of water.
Various media: Prepared by adding a small amount of "Casamino acid (Vitamin free)" (brand name), lysine, arginine, yeast extract and/or RNA to the medium (A).

| Medium (B): | Yeast extract | 2 grams |
| --- | --- | --- |
| | Peptone | 3 |
| | Glucose | 4 |
| | $KH_2PO_4$ | 1 | dissolved in one liter of water.
Various media: Prepared by adding a small amount of ammonium sulfate, $CaCl_2$, $MgSO_4$, $MnSO_4$, $FeSO_4$, $ZnSO_4$ and/or $CuSO_4$ to medium (B).
The medium: employed in Example 1.

2. Growth on media

Bouillon agar plate: Circular or irregular, umbonate, smooth, filamentous, grayish white.
Bouillon agar slant: Growth moderate, spreading, smooth, grayish white.
Gelatin stab: No liquefaction on nutrient gelatin (made by Difco Co.). Slow liquefaction by shaking on brain heart infusion gelatin (made by Difco Co.).
Glucose nutrient agar slant: Growth poor.
Nutrient broth: Growth poor, turbid.
Milk: Unchanged.
Sodium chloride bouillon liquid: Growth moderate below 9 percent of sodium chloride under shaking. Growth poor at 13 percent of sodium chloride.

3. Physiological properties

Temperature relations: Optimum between 20°C and 42°C. Maximum about 55°C. No growth above 60°C.
Growth pH: Growth moderate between pH 6.5 and 9.5.
Catalase: Positive.
Starch: Hydrolyzed.
Nitrate reduction: Positive.
$H_2S$: Not produced on kligler medium.
Indole: Not produced.
Acetylmethylcarbinol: Not produced.
Citric acid: Utilized rapidly on Christensen medium and slowly on Simmons medium.
Assimilation of carbohydrates: No acid and no gas, aerobically and anaerobically, from glucose, galactose, mannose, fructose, xylose, arabinose, glycerol, maltose, lactose, trehalose, mannitol, sorbitol and inositol.
Urease: Negative.
Cytochrome oxidase: Positive. Aerobic, facultatively anaerobic.
Growth factor: Biotin and vitamin $B_1$.
Guanine and Cytosine content of DNA: 44.9 percent.
Dibasic amino acid in cell wall: DL-Diaminopimelic acid.

The characteristics of the strain were compared with "Bergey's Manual of Determinative Bacteriology", 7th edition, and the strain is considered to belong to genus Bacillus. The morphological properties of the strain, such as rods, gram-positive and motile with peritrichous flagella, agree with the description of genus Bacillus in the reference, although no spore is formed in the various media. Moreover, the assumption of the strain belonging to genus Bacillus is supported by the facts that the guanine and cytosine content of DNA is 44.9 percent and that DL-diaminopimelic acid is contained by the cell wall. At the present stage, this strain can not be identified with any species of Bacillus according to Bergey's Manual, because species of genus Bacillus are determined on the basis of the form and the position of the sporangia.

Protease is produced by culturing a bacterium of genus Bacillus on a medium containing an assimilable carbon source, an assimilable nitrogen source, inorganic salts and organic nutrients. The assimilable carbon sources include carbohydrates, such as starch, starch hydrolyzate, dextrins, sucrose and glucose, and organic acids, such as acetic acid and citric acid. The assimilable nitrogen sources include ammonium salts, such as ammonium sulfate, ammonium succinate, and natural organic substances, such as milk casein, soybean protein, peptone, meat extract, amino acids mixture.

The cultivation is carried out for 20 to 60 hours under aerobic conditions, while the pH is kept between 6 and 9.5, preferably between 7 and 8.5, by adding aqueous acetic acid or aqueous sodium hydroxide. The temperature is maintained at 20° to 50°C, usually 34°C, and the aeration is carried out either by shaking (100 – 150 rpm) or by aerating with stirring (½ – 1/10 v/v, 100 – 1,000 rpm). A concentration of 15,000 to 38,000 units of the alkaline protease per milliliter of the culture broth is achieved. The yield is much higher than from known methods.

In order to recover the protease from the cultured broth, bacterial cells are removed by filtration or centrifugation, and the protease is precipitated from the liquid by adding inorganic salts such as ammonium sulfate or Glauber's salt, and/or water miscible organic solvents. The precipitate is recovered by filtration or centrifugation, followed by vacuum drying or spray drying. The protease activity of the dried matter is 750 to 2,000 units per milligram.

For purification, the dried matter is dissolved in water, decolorized with DEAE-cellulose, and ammonium sulfate is added to the solution. The precipitate formed is collected by centrifugation, dissolved in water, and gel-filtered with "Sephadex G-100" (brand name). After the treatment, the filtrate is dialyzed in tap water, and freeze-dried to a partly purified enzyme powder.

The powder is dissolved in distilled water at a rate of about 3% by weight of the enzyme proteins, ammonium sulfate is added gradually, and the solution is kept in a refrigerator overnight. The crystalline precipitate formed is filtered off, washed with a small amount of chilled water, and re-crystallized by salting-out as above to produce crystalline pure enzyme. The protease activity is 4,500 units per milligram. A single peak is obtained in the disc electrophoretic and ultracentrifugal analysis of the pure enzyme.

Alkaline protease activity was determined by the Anson method, i.e., a milk casein ("casein nach Hammerstein"; brand name) was digested with the protease in a 0.05 M borax buffer solution of pH 11 at 37°C for 10 minutes, trichloroacetic acid was added for terminating the reaction, and the tyrosine produced was colorimetrically determined by using Folin-Ciocalteu's reagent. One unit was defined as the protease activity which produces 1 microgram of tyrosine per minute.

The alkaline protease obtained by the present invention has the following properties.

Figure 2:
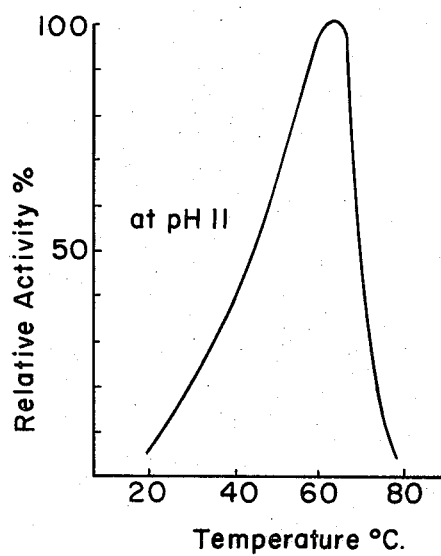
Figure 3:
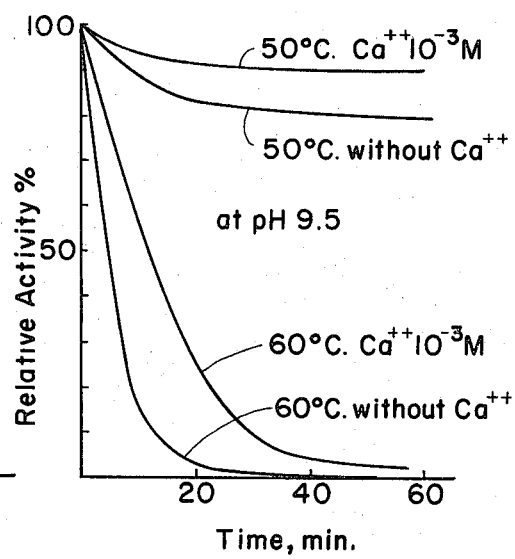

1. 1. The optimum pH and pH stability are shown in FIG. 1. As can be seen from the figure, the optimum pH is at 11 – 12, and the stable range is at pH 5.5 to 9.0. pH Stability of the enzyme was estimated by measuring residual protease activity after heating at 50°C for 30 minutes.
2. As shown in FIG. 2, the optimum temperature is at 60°C.
3. Thermostability is shown in FIG. 3. The enzyme cannot be inactivated by heating at 50°C for 60 minutes, while it has been almost inactivated by heating at 60°C for 30 minutes.
4. Specificities toward substrate are listed in Table 1 as hydrolysis rate of acylamino acid esters measured by the usual pH stat method. As can be seen from the table, acetyltyrosine ethyl ester, acetylphenylalanine ethyl ester and benzoylmethionine methyl ester are readily hydrolyzed.
5. The enzyme is strongly inactivated by $10^{-3}$ M of diisopropylfluorophosphate (DFP), while it is hardly inactivated by less than $10^{-3}$ M of ethylenediaminetetraacetate (EDTA) and of orthophenanthroline.
6. The enzyme is strongly inhibited by mercuric ion, and the thermostability of the enzyme is somewhat lowered by cupric, cadmium, nickel and strontium ions, whereas it is somewhat increased by calcium ion.
7. The molecular weight of the enzyme is 16,000 or 17,500 as determined respectively by gel-filtration with "Sephadex G-100" (brand name) and by the sedimentation equilibrium method.
8. An isoelectric point of 10.6 was obtained by using a "LKB" (brand name) column packed with carrier ampholite.
9. The amino acid composition is given in Table 2.

A comparison of the properties with those of known protease indicates that the present enzyme is new. The molecular weight of the present enzyme is smaller than that of every known enzyme, and the amino acids composition is distinct from that of known protease. As to substrate specificity, the digestion rate of benzoylleucine ethyl ester is only 0.06 times that of acetyltyrosine ethyl ester, and this value is one tenth of the corresponding value for known protease. The stable pH range is nearly equal to the usual protease values. However the optimum pH is different from that of the protease, mentioned in the Dutch Published application No. 6815944, and the stable pH range is different from the protease discovered by Horikoshi et al. Some properties of the protease obtained by this invention are compared with those of several known proteases in Table 3.

EXAMPLE 1

Thirty liters of culture medium containing 5.0 g/dl of soluble starch, 2.0 g/dl of glucose, 3.0 g/dl of casein in technical grade, 5.0 g/dl of corn steep liquor, 2.0 g/dl of soybean flake hydrolyzate ("Mieki"; nitrogen content 2.4 percent), 0.375 g/dl of potassium dihydrogenphosphate and 0.02 g/dl of magnesium sulfate hepta hydrate of pH 8 was prepared, placed in a 70 liter jar fermenter, and sterilized at 120°C for 30 minutes. The medium was inoculated with 1.5 liters of Bacillus sp. (FERM P-1396) in a liquid medium containing 5.0 g/dl of soluble starch, 0.5 g/dl of soybean protein, 1.0 g/dl of meat extract, 1.0 g/dl of peptone and 0.5 g/dl of sodium chloride of pH 8, and cultured at 34°C for 60 hours while stirring (400 rpm) and aerating (½ volume of culture medium per 1 hour). During the cultivation, the culture medium was mainteined between pH 7.5 and 8.5 using aqueous acetic acid and aqueous sodium hydroxide. The culture broth was found to contain 32,800 units/ml alkaline protease.

The culture broth was centrifuged to remove bacterial cells, 900 g of Glauber's salt was dissolved in the supernatant, and 60 liters of isopropyl alcohol was added little by little, while cooling at 5°C.

The protease precipitated was collected by centrifuging, dried in vacuo overnight with cooling, and a crude enzyme powder containing 2,250 units/mg was obtained in an amount of 3.5 kg (yield of separation: 80 percent).

Table 1

| | Rates of hydrolysis mole/min enzyme mg/ml | Relative rate |
|---|---|---|
| Acetyltyrosine ethyl ester | 4556 | 100 |
| Benzoyltyrosine ethyl ester [a] | 476 | 11 |
| Acetylphenylalanine ethylester | 2852 | 63 |
| Acetyltryptophan ethyl ester [a] | 312 | 7 |
| Benzoylleucine ethyl ester [a] | 260 | 6 |
| Acetylvaline methyl ester | 26 | 0.6 |
| Tosylalanine ethyl ester [b] | 432 | 9.5 |
| Benzoylglycine methyl ester [c] | 11 | 0.2 |
| Benzoylmethionine methyl ester [c] | 1118 | 25 |
| Tosylmethionine ethyl ester [d] | 93 | 2 |
| Benzoylarginine ethyl ester | 11 | 0.2 |
| Tosylarginine methyl ester | 0 | 0 |
| Tosyllysine methyl ester | 35 | 0.8 |
| Benzoylhistidine methyl ester | 258 | 5.7 |
| Benzyloxycarbonylserine methyl ester [d] | 204 | 4.5 |

The reaction conditions: 10 Milli M of substrate and 0.15 M of potassium chloride in solvents identified below were mixed with the protease to give 50 – 200 g/ml, and the reaction was carried out at pH 8.0 at 37°C.

Solvent

| No mark | Water | |
|---|---|---|
| a) | Water containing | 5% of acetone |
| b) | | 10% of acetone |
| c) | | 15% of acetone |
| d) | | 30% of acetone |

Table 2

| Amino acid | The present enzyme | No.221 [*1] | Known enzyme Nagarse [*2] (BPN') | B.subtilis [*3] (Carlsberg) |
|---|---|---|---|---|
| | | (The number of unit molecules) | | |
| Lysine | 3 | 6 | 11 | 9 |
| Histidine | 3 | 8 | 6 | 5 |
| Arginine | 5 | 8 | 2 | 4 |
| Aspartic acid | 19 | 29 | 28 | 28 |
| Threonine | 11 | 18 | 13 | 19 |
| Serine | 21 | 23 | 37 | 32 |
| Proline | 10 | 16 | 15 | 12 |
| Glutamic acid | 9 | 16 | 14 | 9 |
| Glycine | 24 | 39 | 33 | 35 |
| Alanine | 25 | 45 | 37 | 41 |
| Cysteine | 0 | 0 | 0 | 0 |
| Valine | 17 | 27 | 35 | 31 |
| Methionine | 2 | 4 | 5 | 5 |
| Isoleucine | 6 | 9 | 13 | 10 |
| Leucine | 13 | 22 | 15 | 16 |
| Tyrosine | 5 | 7 | 10 | 13 |
| Phenylalanine | 1 | 2 | 3 | 4 |
| Tryptophan | 2 | 5 | 3 | 1 |

[*1] K. Horikoshi, Agr. Biol. Chem., 35, 1407 ('71)
[*2] F.S. Markland, E.L. Smith, J. Biol. Chem., 242, 5198 ('67)
[*3] E.L. Smith, et al., J. Biol. Chem., 243, 2184 ('68)

Table 3

| | The present enzyme | Known enzyme No.221 [*1] | "Nagarse" [*2] (BPN') |
|---|---|---|---|
| $E_{1cm}^{1\%}$ at 280 m$\mu$ | 9.4 | 12.5 | 11.7 |
| Molecular weight | 17,500 | 30.000 | 27,700 |
| Isoelectric point | 10.6 | 9.4 | 7.8 |
| Optimum pH | 11.5 | 11.5 | 10.5 |
| Relative activity (units/mg enzyme protein) | 4,500 | 18,000 | 2,200 |

[*1] K. Horikoshi, Agr. Biol. Chem., 35, 1407 ('71)
[*2] H. Matsubara, et al., J. Biol. Chem., 240, 1125 ('65)

What we claim is:

1. A method of producing a protease having optimum pH between 11 and 12 and being stable at pH 5.5 to 9.0 when heated 30 minutes to 50°C in an aqueous medium which comprises:
   a. culturing the gram-positive, asporogenous strain Bacillus sp. FERM P-1396 in an aqueous nutrient medium containing assimilable sources of carbon and nitrogen, inorganic salts, and minor organic nutrients until a significant amount of said protease is accumulated in said medium; and
   b. recovering the accumulated protease from said medium.

2. A microbial protease prepared by the method set forth in claim 1, said protease having an optimum pH between 11 and 12, a molecular weight between 15,000 and 20,000, as measured by the sedimentation equilibrium method, an isoelectric point above pH 10, said protease being stable at pH 5.5 to 9.0 when heated 30 minutes at 50°C.

* * * * *